UNITED STATES PATENT OFFICE.

FRANK B. GALLIVAN, OF NEWTON, MASSACHUSETTS, ASSIGNOR TO THE NEWTON COMPANY, OF NEWTON, MASSACHUSETTS, A CORPORATION OF MAINE.

WATERPROOF LEATHER-BOARD AND PROCESS OF PREPARING THE SAME.

1,142,953.   Specification of Letters Patent.   Patented June 15, 1915.

No Drawing.   Application filed April 3, 1911.   Serial No. 618,517.

*To all whom it may concern:*

Be it known that I, FRANK B. GALLIVAN, a citizen of the United States, residing at Newton, in the county of Middlesex and State of Massachusetts, have invented new and useful Improvements in Waterproof Leather-Board and Processes of Preparing the Same, of which the following is a specification.

This invention relates to the manufacture of leatherboard, and has for its object the production of a leatherboard which will be effectively waterproof and will also be less expensive to manufacture than the waterproof leatherboards produced by previously existing processes.

Briefly described, my process consists in thoroughly mixing a basic compound (the hydroxid or basic carbonate) of some one or more of the metals known in chemistry as the third-group metals with a suitable pulp material consisting in whole or in large part of the fibers of tanned leather, and then forming the pulp thus treated into the final product in the usual or any suitable manner. By the expression "third-group" I intend to refer to the metals of that group which includes as its principal components the elements aluminum, chromium, manganese and iron, each of which elements is characterized by forming a gelatinous basic compound upon the addition of a soluble alkali or alkaline carbonate to a solution containing a salt of the element. In practising my process I prefer to employ a compound of aluminum, since an inexpensive compound of this metal, suitable for the purpose, is readily obtained and does not darken the leatherboard, but in case a dark-colored leatherboard is not objectionable suitable compounds of other third-group metals may be employed if desired, or various mixtures of the compounds above referred to may be utilized.

In detail the process may be carried on as follows: A batch of pulp is prepared in a beater in the usual way, and with this pulp is mixed a quantity of the gelatinous aluminum compound which is precipitated when a soluble alkali or alkaline carbonate is added to a solution of a salt of aluminum. This gelatinous compound is preferably formed by dissolving aluminum sulfate in water and adding sodium carbonate thereto. The quantity of aluminum sulfate employed will depend upon the proportion of tanned leather in the stock used in the beater, but about fifteen pounds of commercial aluminum sulfate in the crystalline form will ordinarily yield enough of the gelatinous compound for treating the pulp made from about one hundred and fifty pounds of dry stock containing seventy-five to eighty per cent. of tanned leather. The quantity of sodium carbonate employed will be such that it will re-act completely with the aluminum sulfate to precipitate the aluminum therefrom, the resulting gelatinous compound being mainly a basic carbonate of aluminum and ordinarily about seven and one-half pounds of dry or anhydrous sodium carbonate will suffice for fifteen pounds of commercial aluminum sulfate.

The production of the gelatinous aluminum compound may be accomplished in the beater or in any other suitable receptacle, and it may be mixed with the pulp in the beater, either during or after the beating operation, or in any other suitable receptacle such as the stuff-chest, it being important merely to insure a thorough incorporation of the compound with the wet pulp.

If desired the aluminum sulfate and the sodium carbonate may be added to the water in the beater before the material to be ground into pulp is introduced therein, whereupon, upon running the beater in the usual manner, the precipitate produced will be incorporated in the fibers of the pulp during the beating operation.

The leather stock employed may be composed entirely of tanned leather scrap, or it may consist in part of other fibrous materials such as are often employed in the manufacture of leatherboard, such, for example, as bagging, jute or the like. The aluminum compound above described, however, seems to have no waterproofing effect upon the last-mentioned ingredients or upon other fibers of vegetable origin, its waterproofing effect being apparently confined to the fibers of tanned leather, with which it evidently combines to form a waterproofing compound derived in part from the tanning agent contained in the fibers, but the presence of vegetable fibers in the proportion in which they are commonly employed in the manufacture of ordinary leatherboard will not prevent the final product from being practically waterproof.

After the pulp has been prepared and thoroughly mixed with the gelatinous aluminum compound as above described, it is treated in the ordinary manner by means of the wet machine and other apparatus commonly employed in the manufacture of ordinary leatherboard.

In place of using the aluminum sulfate, ordinary alum may be employed, the quantity being so calculated as to result in the production of the proper amount of basic aluminum compound, and potassium carbonate or any other soluble carbonate or alkali which will precipitate aluminum hydroxid or basic aluminum carbonate may be used in place of the sodium carbonate, as will be obvious to chemists, or various mixtures of the chemicals above referred to may be used if preferred, or the gelatinous basic compound may be produced electrolytically, but aluminum sulfate and sodium carbonate are as inexpensive as any of the available aluminum compounds with which I am acquainted and seem to give the best results with respect to the waterproof quality of the product, and for these reasons I prefer to use said chemicals only, as previously described.

The leatherboard produced by my process is found to be effectively waterproof and, if waterproofed by the use of aluminum compounds as above described, is light in color without being too hard and brittle, all of which characteristics are desirable in a product of this sort.

I claim as my invention—

1. The herein described process of producing waterproof leatherboard, which consists in thoroughly mixing with a pulp containing fibers of tanned leather a suitable quantity of a basic compound of a third-group metal, and then forming the pulp thus treated into the desired product.

2. The herein described process of producing waterproof leatherboard, which consists in thoroughly mixing with a pulp containing fibers of tanned leather a suitable quantity of a basic compound of aluminum and then forming the pulp thus treated into the desired product.

3. The herein described process of producing waterproof leatherboard, which consists in thoroughly mixing with a pulp containing fibers of tanned leather a suitable quantity of a gelatinous basic compound of a third-group metal, and then forming the pulp thus treated into the desired product.

4. The herein described process of producing waterproof leatherboard, which consists in thoroughly mixing with a pulp containing fibers of tanned leather a gelatinous aluminum compound of basic character, and then forming the pulp thus treated into the desired product.

5. As a new article of manufacture, leatherboard comprising previously disintegrated fibers of tanned leather and rendered waterproof by the combination with said fibers of a basic compound of one or more third-group metals.

6. As a new article of manufacture, leatherboard comprising tanned leather fibers intimately mixed with a waterproofing product derived from the action upon said fibers of a basic compound of one or more third-group metals.

7. As a new article of manufacture, leatherboard comprising tanned leather fibers intimately mixed with a waterproofing product derived from the action upon said fibers of a basic aluminum compound.

8. As a new article of manufacture, leatherboard comprising tanned leather fibers intimately mixed with a waterproofing product derived from the action upon said fibers of a basic gelatinous compound containing one or more third-group metals.

9. As a new article of manufacture, leatherboard comprising the dried and insoluble product of the intimate mixture of aluminum hydroxid with tanned leather fibers.

In testimony whereof, I have hereunto subscribed my name this 1st day of April, 1911.

FRANK B. GALLIVAN.

Witnesses:
JOSEPH T. BRENNAN,
E. D. CHADWICK.